Jan. 21, 1969  G. JAKAB  3,423,051
HOMING SYSTEM FOR AIRCRAFT
Filed Oct. 22, 1965
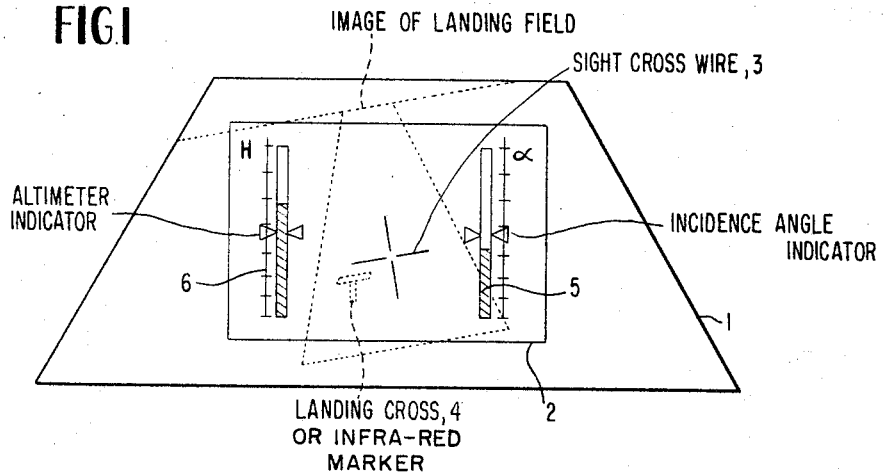
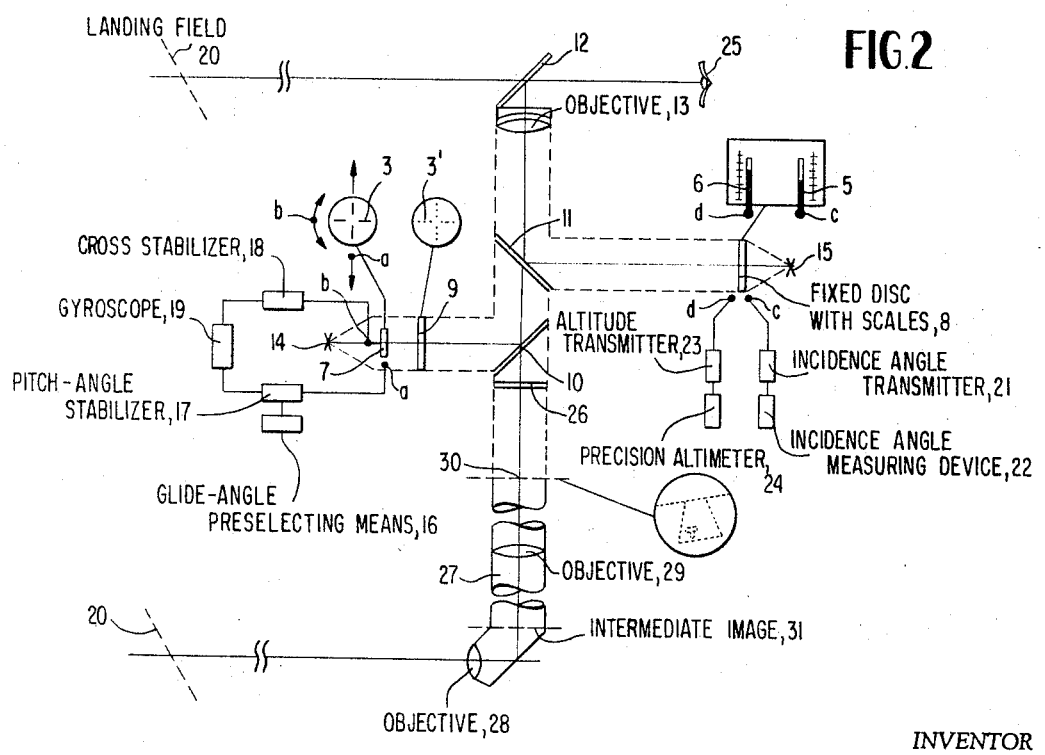
INVENTOR
GABOR JAKAB
BY
ATTORNEYS United States Patent Office 3,423,051
Patented Jan. 21, 1969

3,423,051
HOMING SYSTEM FOR AIRCRAFT
Gabor Jakab, Markdorf, Germany, assignor to Dornier-Werke G.m.b.H., Friedrichshafen, Germany
Filed Oct. 22, 1965, Ser. No. 501,512
U.S. Cl. 244—76   14 Claims
Int. Cl. B64c *19/00;* G01c *23/00, 21/00*

ABSTRACT OF THE DISCLOSURE

This invention comprises an adjustable sighting device whose line of sight points towards the touch-down point on the ground at an inclination corresponding to the angle of approach. The line of sight is held at a preselectable constant angle of inclination relative to the geodetic horizontal plane by stabilizing means during all possible flight movements during approach. The azimuth direction of the line of sight is maintained either parallel to the plane of symmetry of the aircraft, or is adjustable at an angle with the plane of symmetry which angle is required by the mechanics of flight. The adjustable sighting device enables the pilot of the aircraft being landed to directly view the landing field by means of a periscope, if otherwise the pilot's vision is obstructed by fuselage parts, heat shields, etc., and portrays the necessary information required to accomplish a safe landing on an appropriate reflex sighting pane mounted on the windshield of the aircraft so that the pilot does not have to divert his view from the approaching landing field and yet is provided with all necessary information pertaining to the safe landing.

---

The present invention relates to homing aids located on board of an aircraft for facilitating precision landing under good visibility conditions.

The invention is a further development and improvement of the invention disclosed in U.S. Patent No. 3,190,585.

The capability of using small and limited landing areas is required for numerous operations of fighter planes, interception fighter planes and transport planes as well as of liaison airplanes and short take-off transport planes. For economic or military reasons, landing aides, such as beacons, optical directional beams for marking the glide path, mirrors, etc. have to be dispensed with, i.e., are not provided. Landing under the aforesaid conditions is possible only if the final approach takes place under almost optimal conditions of the mechanics of flight, i.e., if the gliding angle, the angle of pitch and the speed are so adjusted that flattening-out and rolling-out after touchdown is effected within the shortest possible distance.

With the conventional approach of modern airplanes the estimating capability of the pilot is frequently overextended, although aiding devices are provided aboard. It is particularly difficult to maintain the correct flying speed since this speed depends on the total weight of the aircraft which depends on the amount of fuel on board, the payload, etc. and which may thus be very different at different times.

It has already been proposed to make the approach according to the optimal angle of incidence since the latter is independent of the given flying weight and therefore constant. The choice of the correct gliding angle, however, depends again on the estimating ability of the pilot. There exists the danger that the necessary correcting maneuvers cause landing speeds which are too high, or cause missing the correct touchdown points.

A gliding angle indication has also been proposed in combination with a line of sight which is rigid relative to the aircraft. Such line of sight can be used in practice only in a limited way because with the always-needed correction of the angle of pitch the line of sight drifts in an undesired manner. Furthermore, there exists the danger, if the angle of incidence is not controlled simultaneously with the aiming operation, that the aircraft is pushed over or stalled.

It is an object of the present invention to provide a homing aide for aircrafts which relieves the pilot of making subjective estimates of the gliding angle during the landing approach and which, at the same time enables the pilot to supervise and control the flight parameters needed for maintaining a descending course which is optimal with respect to the mechanics of flight, without having to take his eyes from the landing field. The device according to the present invention operates independently of changes of inclination and accelerations.

This object is obtained, according to the present invention, by providing an adjustable sighting device whose line of sight points toward the touchdown point on the ground at an inclination corresponding to the angle of approach, whereby the line of sight is held at a preselectable constant angle of inclination relative to the geodetic horizontal plane by stabilizing means during all possible flight movements during approach whereas the azimuth direction of the line of sight is either parallel to the plane of symmetry of the aircraft or is adjustable at an angle with the plane of symmetry which angle is required by the mechanics of flight. The device according to the present invention enables the pilot to directly view the landing field by means of a periscope, if, otherwise, the pilot's vision is obstructed by fuselage parts, heat shields, etc.

The novel features which are considered characteristic of the present invention are set forth with particularity in the appended claims. The invention itself, however, and additional objects and advantages thereof will best be understood from the following description of embodiments thereof when read in connection with the accompanying drawing, wherein:

FIGURE 1 shows a landing field as seen by the pilot in a sight apparatus according to the present invention, with sighting data projected into the landing field; and FIGURE 2 is a diagrammatic illustration of the optical and electrical parts of the sighting apparatus according to the present invention.

Referring more particularly to FIGURE 1 of the drawing, reference numeral 1 designates therein the contour of a windshield and reference numeral 2 the contour of a reflex sighting pane which is inclined relative to the line of vision of the pilot. An aiming cross wire 3 which constitutes one form of a suitable aircraft aiming graticule marks the intersection of the line of sight with the landing field which is represented by dotted lines and by a landing cross 4. The line of sight of the aircraft aiming graticule 3 which is adjustable to a selectable vertical landing approach angle, remains stationary relative to a geodetic coordinate system, independently of changes in the angle of pitch and in the banking of the aircraft. Consequently, if the center of gravity of the aircraft moves downward along the desired glide path, the aiming cross 3 continuously points toward the intersection of the desired glide path with the landing field.

Reference numeral 5 designates the indication appearing on the right side of the sight apparatus and supplying the information concerning the instantaneous angle of incidence. The indication 6 at the left side is derived from a precision altimeter H.

FIGURE 2 diagrammatically illustrates the fundamental arrangement and operation of the sight apparatus according to the present invention. It has an optical part comprising an aircraft aiming graticule image producing means including a cross wire disc 7 and a scale disc 8, semitransparent mirrors 9, 10, 11 and 12, and an objective 13. The discs 7 and 8 are lighted by light sources 14 and 15 respectively. The light-path distances between the discs 7 and 8 and the objective 13 are equal and correspond to the focal distance of the objective. In this way the image planes of the discs 7 and 8 are projected into infinity or, after deflection through the semitransparent reflecting pane 12, are so projected into the eye of the observer, that the indications appear to be located in the plane of the landing field. The disc 7 with the cross wires thereon can be deflected vertically and can also be rotated about its center by conventional actuating means of any construction. The vertical deflection is initially adjusted by a glide-angle preselecting device 16 of any conventional construction and is stabilized by means of an angle of pitch stabilizer 17 also of any conventional construction to which the preselecting means 16 is operatively connected in any appropriate manner, known per se in the prior art. A cross or lateral stabilizer 18 also of any conventional construction assures the position of the cross wire 3 parallel with the horizon. The pitch stabilizer 17 and the lateral or cross stabilizer 18 are controlled in a conventional manner by a gravity erected gyroscope 19. All movements of the element 7 are effective as movements of the image of aiming graticule or cross wire 3 appearing in the landing field 20. The scale disc 8 is rigidly mounted and comprises the scale markings of the angle of incidence indicator 5 and of the altimeter 6 (or such other and/or additional markings as may be desired). The respective indicating means are in a common image plane. The angle of incidence indication is actuated by means of a conventional angle of incidence transmitter 21 which is connected to a conventional measuring instrument 22. The indication of the altimeter is actuated by a conventional altitude transmitter 23 which is connected to a conventional precision altimeter 24. The indications of the devices 5 and 6, viewed by the eye of the pilot, appear in the landing plane 20.

The eye 25 of the pilot is in the correct position when he sees the image of the aiming graticule or cross wire 3 of the semi-mirrored disc 7 coinciding with the image 3' of the cross wire 3 on the disc 7, reflected by the semi-mirrored disc 9. This arrangement is primarily necessary for adjusting the device to suit the normal position of the eye of the pilot. With the described beam arrangement the sighting error is negligible at small deviations of the position of the eye of the pilot from the desired line of sight.

If there is no direct sight connection between the landing field 20 and the pilot's eye 25, a periscope-like auxiliary device 27 may be made effective by opening a flat 26. The optical system of the periscope includes objectives 28 and 29 and is so arranged that the image plane 30 is as the focal distance from the objective 13. The objective 28 of the periscope which produces an intermediate image at 31, is preferably formed by a so-called zoom lens-system of variable focal distance in order to enable changing the image scale of the viewed portion of the landing field 20. For the sake of clarity, collimating lenses, necessary for affecting the illuminating beam path, have not been shown either in the landing sight or in the periscope.

*Operation*

The homing flight takes place in the following manner:

After the pilot has effected exact course to the touchdown point, he preselects the desired gliding angle by means of the device 16. Shortly before the touchdown point appears in alignment with the image of the aircraft aiming graticule or cross wire 3, the pilot adjusts flight parameters, as angle of incidence, speed, thrust and also the landing flaps, etc., according to the optimal homing flight conditions for the desired gliding angle. From now on the pilot must only maintain constant the angle of incidence and assure with the aid of thrust corrections that the image of the aircraft aiming graticule or cross remains in coincidence with the touchdown point. Correction of the lateral or cross position is made possible by observing the rotation of the aiming cross wire without having to take off his eye from the landing field. The same is true with other flight supervisory data, for example, altitude, which are projected into the field of vision of the pilot. This renders it possible to initiate the flattening-out operation at the correct moment.

The foregoing example deals with a simplified, schematized case. Depending on the use of the aircraft, variations and additions based on the same principle may be made. For example, a conventional, adjustable drift angle correction of the cross wire 3 and a conventional stabilizing arrangement connected with a directional gyroscope or gyrocompass may be provided which also affect, i.e., control the cross wire disc 7. In addition to or in lieu of the altimeter indication, indication of speed or of another condition which must be supervised may be projected in a similar manner into the field of vision of the pilot. Further, while in the present embodiment of the invention the cross wire disc 7 has been the element of the aircraft aiming graticule image producing optical system which is stabilized at the preselected landing angle of approach, it is believed obvious that other elements of the optical system could be similarly stabilized with equivalent results.

In a further development of the instant invention, the sighting device according to this invention may be used as an element of a control system carrying out a semi-automatic landing operation. In this case a signal must be transmitted from the device for preselecting the gliding angle to the flight regulator of customary conventional construction which adjusts the attitude and thrust parameters according to the preselected optimal gliding angle. A correcting signal is transmitted from an additional device of the sight system to the flight regulator. This correcting signal may be obtained, for example, by providing the sight system with a second, horizontally stabilized cross wire which may be manually adjusted by the pilot to be in line with the touchdown point. The difference between the position of the adjustable cross wire and the cross wire fixed by the preselection of the gliding angle is a measure for the gliding angle correction. When using this arrangement, the pilot must merely preselect the optimal gliding angle and always so readjust the adjustable cross wire that its intersecting point coincides with the touchdown point.

The periscope principle described herein need not be limited to the use of visible light. By using conventional means, infrared images of the landing field may be projected into the image plane 30. In this manner, for example, night landings are possible without special ground aides or assists, other than simple infrared markers which are placed at the touchdown point on the landing field and suffice under adverse weather conditions to enable a pilot to perform a homing flight. For use in this manner, the sighting means includes some means for converting the infrared marker rays into an image within the visible spectrum within the field of vision of the pilot.

The invention is applicable to various types of aircraft. It can be used in connection with high-speed aircraft, landing at a very flat angle, as well as in connection with short take-off aircraft and vertical take-off aircraft operating at a steep approach angle. With the last-mentioned aircraft, the sighted point of the landing field may be held in the line of sight up to touchdown because there may not be a flattening out operation.

The present invention can also be used in connection with manned spacecrafts which perform the landing phase in a glide, possibly with effecting the gliding angle by jet action or aerodynamic means connected to an aerofoil. In this case the supplemental telescope-like arrangement is of particular advantage because for aerodynamic reasons or because of heat shielding the pilot's compartment usually permits only a very small field of vision.

The homing system according to the invention can be arranged to selectively serve as sighting device for military use, for example, as bombsight, sight for weapons aboard the aircraft, and the like. In this case, the necessary supplemental arrangement would be added to the electrical and optical part of the system according to the invention.

I claim:

1. A homing device for aircrafts, comprising, sighting means supported on the aircraft and including a single, adjustable aircraft aiming graticule image producing means whose line of sight extends to the touch-down point on the ground at a preselectable angle of inclination corresponding to the desired landing approach angle, and stabilizing means operatively connected with said including a single adjustable stabilized aircraft aiming graticule image producing means for maintaining the line of sight during all flight movements of a landing approach in a manner such that the preselectable angle of inclination with respect to the geodetic horizontal plane is maintained constant at said desired landing approach angle and for maintaining the azimuth direction of the line of sight at a predetermined position relative to the plane of symmetry of the aircraft.

2. A homing device for aircrafts as defined in claim 1, wherein said predetermined position is at an angle to the plane of symmetry of the aircraft, said last mentioned angle being defined by the flight mechanics of the aircraft.

3. A homing device for aircrafts as defined in claim 1, wherein said stabilizing means includes gravity erected gyroscope means.

4. A homing device for aircrafts according to claim 1, further comprising periscope means coacting with said sighting means for projecting an image of the landing field into the field of vision of the pilot.

5. A homing device for aircrafts according to claim 1, further comprising means for producing an image of the landing field by infrared rays, and means for projecting into the field of vision of the pilot a visible image of the landing field from said infrared rays.

6. A homing device for aircrafts, comprising airborne sighting means including a single adjustable stabilized aircraft aiming graticule image producing means whose line of sight extends to the touch-down point on the ground at a preselectable angle of inclination corresponding to the desired landing approach angle, stabilizing means operatively connected with said aircraft aiming graticule image producing means for maintaining the line of sight under all flight movements of a landing approach in a manner such that the preselectable angle of inclination with respect to the geodetic horizontal plane is maintained constant at said desired landing approach angle and for maintaining the azimuth direction of the line of sight at a predetermined position relative to the plane of symmetry of the aircraft, means for optically representing the landing field in said sighting means, means for optically representing the line of sight of said aircraft aiming graticule image producing means in the optically represented landing field, and means for additionally projecting into the optically represented landing field data concerning flight parameters to be supervised by the pilot.

7. A homing device according to claim 6, wherein said flight parameter data includes information concerning the desired angle of incidence.

8. A homing device according to claim 7, wherein said flight parameter data includes information concerning altitude.

9. A homing device according to claim 8, wherein said flight parameter data includes information concerning the velocity of the aircraft.

10. A homing device for aircrafts according to claim 1, further comprising means for optically representing the landing field, means for optically representing the line of sight in the optically represented landing field, means for indicating flight-mechanically desired flight supervising data, and means for optically projecting the indications of said last mentioned means into the optically represented landing field.

11. A homing device for aircrafts according to claim 10, further comprising a sight mark, and means for projecting in optical super-position said sight mark and the indications of the flight-mechanically desired flight supervising data into the field of view of the pilot in such a manner that the image plane is located substantially at the distance of the landing field.

12. A homing device for aircrafts as defined in claim 10, wherein said stabilizing means includes gyroscope means operable independently of any occurring accelerations.

13. A homing device for aircrafts according to claim 10, said means for optically representing the landing field comprising periscope-like means for projecting an image of the landing field inside the aircraft and into the field of vision of the pilot.

14. A homing device for aircrafts according to claim 10, said means for optically representing the landing field comprising means for producing an image of the landing field by infrared rays and means in said sighting means for converting said image of the landing field into an image within the visible spectrum within the field of vision of the pilot.

References Cited

UNITED STATES PATENTS

| | | | |
|---|---|---|---|
| 2,448,023 | 8/1948 | Folland et al. | 33—204 |
| 2,537,996 | 1/1957 | Hankes | 88—24 |
| 2,945,648 | 7/1960 | Oplinger et al. | 244—79 X |
| 3,005,185 | 10/1961 | Cumming et al. | 88—1 |
| 3,128,623 | 4/1964 | Gold | 343—108 |

ANDREW H. FARRELL, *Primary Examiner.*

U.S. Cl. X.R.

73—178; 88—1; 33—204